United States Patent
Mayer et al.

(10) Patent No.: US 8,511,561 B2
(45) Date of Patent: Aug. 20, 2013

(54) SCANNING DEVICE FOR BARCODES

(75) Inventors: Karlheinz Mayer, Blaichach (DE); Jürgen Schützmann, Pfaffenhofen (DE); Bernd Wunderer, München (DE); Thomas Giering, Kirchseeon (DE)

(73) Assignee: Giesecke & Devrient GmbH, Munich (DE)

( * ) Notice: Subject to any disclaimer, the term of this patent is extended or adjusted under 35 U.S.C. 154(b) by 1525 days.

(21) Appl. No.: 11/667,057

(22) PCT Filed: Nov. 3, 2005

(86) PCT No.: PCT/EP2005/011784
§ 371 (c)(1),
(2), (4) Date: Mar. 14, 2008

(87) PCT Pub. No.: WO2006/048292
PCT Pub. Date: May 11, 2006

(65) Prior Publication Data
US 2009/0008455 A1    Jan. 8, 2009

(30) Foreign Application Priority Data
Nov. 4, 2004    (DE) .................. 10 2004 053 293

(51) Int. Cl.
*G06K 7/10*    (2006.01)
(52) U.S. Cl.
USPC ............... 235/462.32; 235/454; 235/462.01; 235/462.41; 235/462.43

(58) Field of Classification Search
USPC ................ 235/435, 439, 454, 470, 472.01, 235/462.01–462.45
See application file for complete search history.

(56) References Cited

U.S. PATENT DOCUMENTS

| | | | | |
|---|---|---|---|---|
| 5,202,784 A * | 4/1993 | Reddersen | .................. | 359/196.1 |
| 5,251,012 A * | 10/1993 | Riegger et al. | ................. | 356/617 |
| 5,266,788 A | 11/1993 | Yamazaki et al. | | |
| 5,304,813 A * | 4/1994 | De Man | ......................... | 250/556 |
| 6,273,337 B1 * | 8/2001 | Detwiler et al. | ......... | 235/462.32 |
| 6,315,201 B1 * | 11/2001 | Reichenbach et al. | .... | 235/462.08 |
| 6,588,669 B1 * | 7/2003 | Claus et al. | ................. | 235/462.4 |
| 6,819,409 B1 * | 11/2004 | Tompkin et al. | ................. | 356/71 |
| 7,136,203 B2 * | 11/2006 | Yokota et al. | ................. | 358/484 |
| 2003/0151788 A1 * | 8/2003 | Claus et al. | .................... | 359/212 |
| 2003/0215127 A1 | 11/2003 | Stern et al. | | |
| 2004/0183004 A1 * | 9/2004 | Niggemann et al. | .......... | 250/271 |
| 2005/0072848 A1 * | 4/2005 | Barkan et al. | ............. | 235/462.38 |

FOREIGN PATENT DOCUMENTS

| | | |
|---|---|---|
| DE | 43 15 105 C1 | 9/1994 |
| DE | 199 24 750 A1 | 10/2000 |
| DE | 102 12 734 A1 | 10/2003 |
| JP | 2-211438 | 8/1990 |

* cited by examiner

*Primary Examiner* — Thien M Le
*Assistant Examiner* — April Taylor
(74) *Attorney, Agent, or Firm* — Bacon & Thomas, PLLC

(57) ABSTRACT

Scanning apparatuses for scanning bar codes applied to documents have a reflector arrangement having either a variable reflection element or a light guide system. The reflection element or light guide system serves to deflect the beam path of the electromagnetic radiation emitted by a radiation source or an illumination device in the document plane along a line substantially perpendicular to the feed direction of the document, or to capture it, and to relay it to a detector.

43 Claims, 6 Drawing Sheets

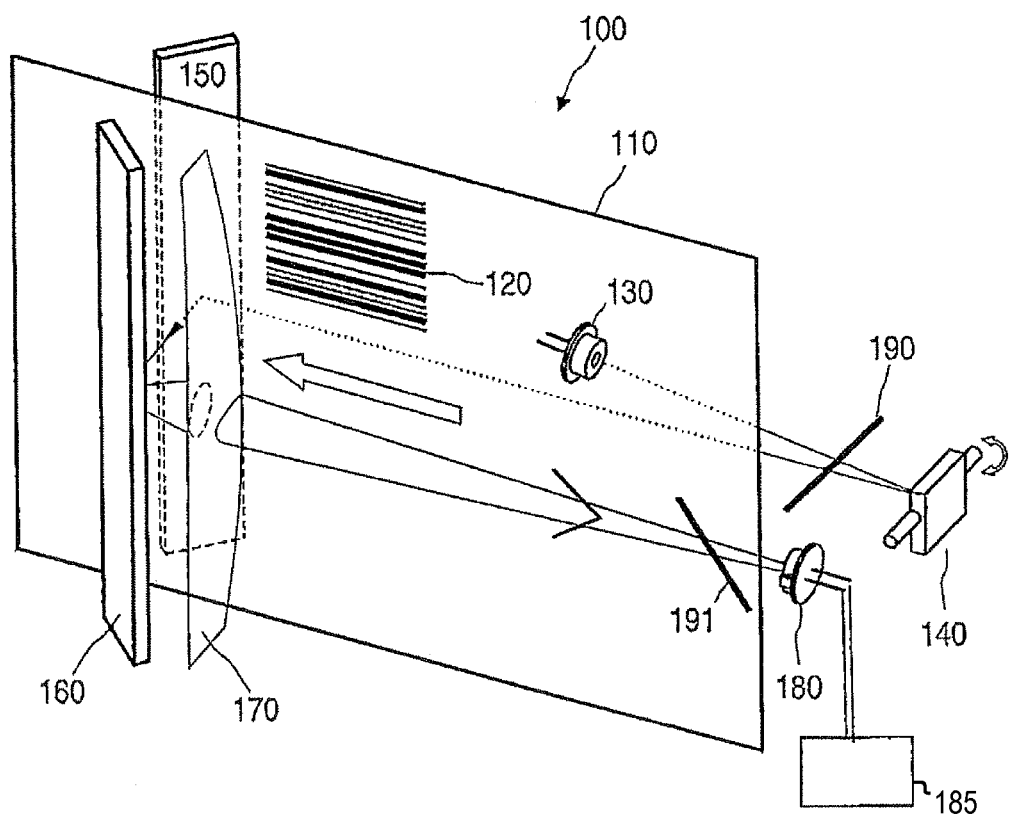
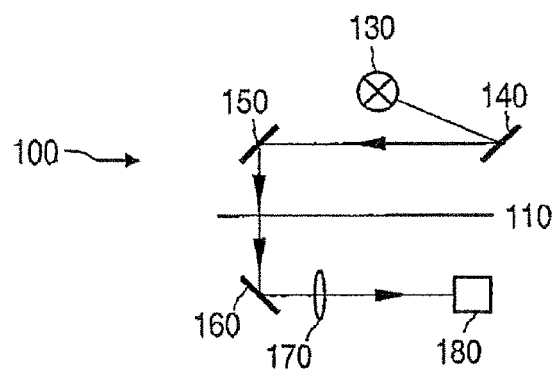
Fig. 1a
Fig. 1b

SCANNING DEVICE FOR BARCODES

FIELD OF THE INVENTION

This invention relates to an apparatus for the multitrack scanning of a bar code located on a document.

BACKGROUND

Bar codes are parallel sequences of bars which are formed two-dimensionally but mostly vary only one-dimensionally, the thickness and spacing thereof coding information. They are present today in many economic sectors for the identification of objects and consumer goods. As a rule, a bar code represents merchandise-related, machine-readable information which codes for example an article number, indication of origin and/or the price of the merchandise. In particular, it is possible to form such bar codes as security features, for example by using fluorescent or luminescent dyes, and to apply them to documents in order to code security-relevant information, such as the denomination of a bank note, the name of the owner or the like.

Scanning apparatuses for the automatic scanning or reading of such bar codes are widely known in the prior art. Such scanning apparatuses comprise at least one light source, frequently a light emitting diode or laser diode, which illuminates the area of the document or object provided with a bar code, a photoelectric detector arrangement which recaptures the light after the scanning of the bar code and transforms it into an electric signal, and an evaluation device which determines the information of the bar code on the basis of the received electric signal.

DE 102 12 734 A1 discloses a scanning apparatus with a laser diode, a mirror system and a detector arrangement which scans a bar code via the mirror system along a measuring line perpendicular to the bars of the bar code. If the bar code has artifacts in the area of said measuring line given by the scanning apparatus, or if the bar code interferes unfavorably with the background pattern of the document in the scanned places, a reliable recognition of the bar code pattern is difficult and the reliable decoding of the information is jeopardized.

DE 199 24 750 A1 discloses a scanning apparatus for bar codes with two light sources and two detector units for scanning a bar code along two different, substantially parallel measuring lines. For this purpose, the document bearing the bar code is guided past the scanning arrangement. However, DE 199 24 750 A1 relates to the scanning of two-dimensional bar codes which have a variable bar pattern in the direction of the measuring line but are divided into two separate partial bars in the direction perpendicular thereto, so that a different black and white pattern is scanned along each of the two measuring lines.

This permits the amount of coded information to be doubled at an equal reading rate in comparison to the apparatus of DE 102 12 734 A1. However, the problem of the artifacts is not solved and the reliability of scanning is not improved in this respect.

An increased reliability of scanning is obtained, however, when the apparatus proposed in DE 102 12 734 A1 is used to scan a conventional one-dimensionally varying bar code and the two results are subsequently matched by an evaluation device. However, such multitrack scanning requires a measurement setup consisting of at least one light source and detector for each measuring track.

The redundancy-based gain in reliability thus comes at a cost which increases linearly with the number of measuring tracks. Furthermore, this principle of hardware redundancy cannot be readily implemented in compact and light scanning apparatuses due to the required space.

SUMMARY

It is therefore the problem of the present invention to propose a scanning apparatus capable of multitrack scanning of a bar code using an inexpensive and compact measurement setup.

This problem is solved according to the invention by apparatuses having the features of the independent claims. Advantageous embodiments and developments of the invention are stated in dependent claims.

Accordingly, during the scanning of the bar code of a document, the document is moved along in a document plane at a certain feed speed by a transport device of the scanning apparatus. Simultaneously, the document is scanned by an approximatively point-shaped scanning beam along a measuring line which is substantially perpendicular to the feed direction, and is evaluated. By the overlapping of the feed motion and the displacement of the scanning beam substantially perpendicular thereto, the document is scanned line by line during the passage through the scanning apparatus. The spatial resolution of the scanning along the measuring line, which is oriented substantially perpendicular to the feed direction, is therefore dependent on the feed speed and the speed of deflection of the measuring beam or the extent of said deflection.

Formulations such as "substantially perpendicular/parallel" are to be understood hereinafter to mean "preferably perpendicular/parallel, but at least not parallel/perpendicular". Thus, the purpose is still fulfilled when the orientation in question might even deviate considerably from the perpendicular/parallel, but no longer in the optimal manner.

The two movements are coordinated with each other in such a way that the bar code, which can fundamentally be located at any place on the document, is scanned at least twice along different measuring tracks at a spatial resolution necessary for complete detection of the bar code, said spatial resolution in turn depending on the spatial frequencies of the bar code pattern.

Within the scanning direction, the beam path of the electromagnetic radiation emitted in a point shape by the radiation source extends through a reflector arrangement which guides the scanning beam into or onto the document plane for scanning the document. From there, it is guided further to a detector which captures the electromagnetic radiation having entered into interaction with the document and relays a corresponding electric signal to an evaluation device.

In all embodiments of the invention discussed hereinafter, the reflector arrangement can be adapted in such a way that the electromagnetic radiation for scanning the document passes through the document (transmission variant), or in such a way that the scanning beam is reflected by the document (remission variant).

In some embodiments, the reflector arrangement comprises a variable reflection element which serves to deflect the point of incidence of the beam path of the electromagnetic radiation in the document plane along a line which is substantially perpendicular to the feed direction of the document. In combination with the feed motion, the line-by-line scanning of the document then results along the various measuring tracks through repeated deflection of the beam path along the line of the document planes by means of the variable reflection element.

It is an advantage of this scanning apparatus that a bar code located on a document can be scanned in several tracks redundantly and thus reliably without the necessity of a considerably higher technical effort in comparison to one-track scanning. Also, the overall size of an inventive scanning apparatus is minimal, since only the variable reflection element is required instead of several radiation sources and detectors.

At the same time, the arrangement of the bar code on the document can fundamentally be chosen at will. Besides the arrangement of the bar code bars parallel to the feed direction, it is also possible, in case of sufficiently fast deflection of the scanning beam by the variable reflection element or in case of an accordingly low feed speed of the document, to perform multitrack scanning of a bar code whose bars are perpendicular to the feed direction. By time multiplexing of the detector device or by other suitable measures it can be achieved in this extreme case that only two or more discrete tracks of the bar code surface are evaluated.

Apart from the variable reflection element, the reflector arrangement can comprise different deflection mirrors and at least one converging lens for obtaining a desired beam path. For example, in transmission scanning it is thus possible to provide an entry mirror on one side of the document plane for deflecting the scanning beam from the variable reflection element to the document plane, and to provide an exit mirror on the other side for deflecting the radiation of the scanning beam passing through the document plane to the detector. Said mirrors are preferably formed so as to extend perpendicularly to the feed direction over the entire extension of the document, so that the entire document can be scanned.

Preferably, in a first embodiment the mirrors are disposed in such a way that the scanning beam on the entry side hits the entry mirror parallel or at least substantially parallel to the document plane, is reflected from there substantially parallel through the document plane, in order to hit the exit mirror on the exit side, which deflects the transmitted electromagnetic radiation again parallel or at least substantially parallel to the document plane toward the detector.

The advantage of this arrangement is that the scanning apparatus can be realized with an extremely small overall depth, since the optical elements required for scanning can be positioned close to the document plane.

Besides this transmission solution, a remission solution is also possible as a variant of the first embodiment. Here, all elements of the reflector arrangement are disposed on one side of the document plane, so that an electromagnetic scanning beam hitting the document plane is reflected by the document there and hits the detector, or is relayed to said detector by an exit mirror, on the same side of the document plane.

In this remission solution it is advantageous for producing a small overall depth of the scanning apparatus to guide the scanning beam emitted by a radiation source by the variable reflection element parallel or at least substantially parallel to the document plane onto an entry mirror which deflects the radiation toward the document plane. Reflected from there, the radiation hits an exit mirror which deflects the radiation again parallel or at least substantially parallel to the document plane toward the detector. In an especially preferred embodiment, the exit mirror has a central gap in which the smaller entry mirror is disposed, so that the latter deflects the electromagnetic radiation arriving from the variable reflection element substantially perpendicularly onto the document plane, and the larger exit mirror guides the radiation diffusely reflected by the document to the detector.

It is also possible here, however, to do without the entry mirror and to provide the variable reflection element for deflecting the scanning beam onto the document plane directly in the gap. However, it must be made sure that the variable reflection element is disposed in relation to the document plane in such a manner that the scanning beam can be deflected along the complete scanning line perpendicular to the feed direction of the document. It is likewise possible to insert the variable reflection element into a gap in the exit mirror.

The electromagnetic radiation leaves a document in a diffuse state both in case of transmission and in case of remission. Therefore, and also because the point at which the electromagnetic radiation leaves the document varies along the scanning line, it is advantageous to provide a converging lens which focuses the diffuse scanning beam from every possible place on the document directly onto the detector. The converging lens is mounted in such a way as to collect all electromagnetic radiation reflected by the exit mirror and supply it to the detector.

Upon use of entry and/or exit mirrors, these are preferably disposed at an angle smaller than 45 degrees in relation to the document plane, thereby further reducing the overall depth of the scanning apparatus.

As variable reflection elements it is fundamentally possible to use those optical reflection devices that are capable of successively deflecting the electromagnetic beam substantially perpendicular to the feed direction. It is suitable to use for this purpose tilting or rotating mirrors in general, and polygonal mirrors in particular.

In a second embodiment of the invention, an entry mirror which reflects the electromagnetic radiation from the variable reflection element into the document plane is constructed from a plurality of mirror segments which in each case deflect onto the document plane the electromagnetic beams reflected at a certain angle interval of the variable reflection element. Each of the individual mirror segments thus has associated therewith a certain portion in the document plane, said portions adjoining each other directly, being spaced apart or overlapping each other.

The motion of the variable reflection element ensures that the individual mirror segments are irradiated by the scanning beam one after another. Correspondingly, a scanning line located substantially perpendicular to the feed direction of the document in the document plane is scanned discretely by sequential irradiation of the individual scanning line portions associated with the particular mirror segments.

Due to the discrete scanning, this embodiment only permits those bar codes to be scanned whose bars are perpendicular or at least substantially perpendicular to the feed direction of the document and thus substantially parallel to the scanning line. The number of tracks of the bar code then scanned corresponds exactly to that of mirror segments disposed along the length of the bars.

The exit mirror can fundamentally be realized in any form as long as it deflects the radiation arriving from the document to the detector, in both the transmission solution and the remission solution of this third embodiment. However, it is particularly advantageous to realize the exit mirror in a segmented form. Ideally, the exit mirror then has, for each segment of the entry mirror, a corresponding segment which captures the radiation of those beams that are deflected by the corresponding segment of the entry mirror into the document plane, and in turn deflects it to the detector.

In transmission scanning, the entry mirror is disposed on one side of the document plane, whereas the exit mirror is positioned accordingly on the opposite side. Preferably, the exit mirror then has a large-surface spherical shape which is disposed around the scanning line in the document plane in such a way that the diffuse radiation transmitted through the document is deflected onto the detector as completely as possible.

It is advantageous here to provide on the side of the exit mirror, for each pair of mirror segments of entry mirror and exit mirror, a converging lens which collects the radiation transmitted through the document and focuses it on the corresponding segment of the exit mirror. In this embodiment, as in all others, such converging lenses are preferably formed as astigmatic lenses.

In a remission solution of this second embodiment, entry mirror and exit mirror are located on the same side of the document plane. It is possible to use here for example a narrow entry mirror which is disposed in a corresponding gap in a larger, possibly spherical exit mirror.

It is likewise possible to provide the entry mirror and exit mirror in the same segmented mirror arrangement in remission scanning, by disposing the segments of the entry mirror and exit mirror alternatingly side by side, the entry segments being irradiated directly by the variable reflection element, whereas the exit segments are only accessible to radiation reflected on the document. The direction in which the reflected scanning radiation is deflected by the exit mirror segments to the detector is then substantially aligned with the scanning beams hitting the entry segments.

In a preferred embodiment of the mirror segments, these can be of concave form both in the entry mirror and in the exit mirror, in order to focus the electromagnetic radiation reflected by them onto a certain point. It is likewise possible to give the segments of the entry mirror a convex shape, so that each entry segment irradiates a wider portion of the scanning line.

As an advantageous variant of both aforesaid embodiments, it is possible to replace the exit mirror by a light collecting element or a light guide, which captures the diffuse radiation coming from the document and relays it to the detector. This permits in particular the expensive segmented exit mirror of the second embodiment to be replaced by a reasonably priced solution.

Since—at a corresponding refraction index—beams from the document hitting the boundary surface of the light guide facing the document substantially perpendicularly are coupled into the guide, a layer comprising scatterers is applied on the opposite boundary surface of the light guide, in the case of transmission scanning, said scatterers scattering or deflecting perpendicularly impinging beams in such a way that they subsequently hit the boundary surfaces of the light guide at smaller angles and thereby remain within the light guide due to a total reflection and are finally guided to the detector.

This light guide solution can likewise be used for remitting scanning, by being disposed in the scanning apparatus between the document and the entry mirror or the reflector element. The scatterer layer faces the entry mirror/reflector element and has a slit through which the scanning radiation is deflected from the entry mirror/reflector element to the document.

In a third embodiment, the variable reflection element is formed as a rotating cylinder whose rotation axis is oriented parallel or at least substantially parallel to the document plane and perpendicular or at least substantially perpendicular to the feed direction of the document.

On the surface of the rotating cylinder, along its rotation axis, a raised, reflecting thread is disposed in a helical shape. The radiation source emitting the scanning beam is disposed in such a way relative to the cylinder that the scanning beam runs axially along the cylinder surface, hits the reflecting thread and is deflected by the same.

Through the rotation of the cylinder the point of the thread where the scanning beam is reflected follows exactly one revolution of the thread and then starts again at the beginning of the thread. Depending on the pitch of the thread, the scanning beam reflected by the thread is thus deflected by a certain distance during one revolution of the cylinder. In this manner the scanning beam can be continuously deflected along the scanning line of the document plane, which is substantially parallel to the rotation axis of the cylinder and substantially perpendicular to the feed direction of the document.

In this embodiment as well, both bar codes whose bars are disposed parallel to the feed direction and bar codes whose bars are disposed perpendicular thereto can be scanned with sufficient spatial resolution if the feed speed of the document and the rotating speed of the cylinder are accordingly coordinated.

In order to reduce the overall depth and achieve the desired compact construction, it is possible to use entry mirrors and exit mirrors as well as a converging lens in the same manner as in the first embodiment. Said optical elements can furthermore be adapted in such a way that the scanning apparatus can be operated in the transmission mode, on the one hand, and in the remission mode, on the other hand.

In an advantageous embodiment of this third embodiment, two reflecting threads are disposed contiguously on the surface of the rotating cylinder. Each of the threads requires its own radiation source, which can be disposed in each case at an opposite end of the rotation cylinder.

There are two variants here. On the one hand, the two threads can be disposed in a helical shape running in the same direction, causing the two scanning beams to be deflected away from the cylinder radially in different directions, so that one variable reflection element can be used to scan two documents simultaneously. On the other hand, the threads can run in opposite directions, so that the two scanning beams can in each case be deflected along a portion of a contiguous scanning line of a document plane. In the latter variant, a double scanning speed results from the simultaneous scanning.

In the following, a fourth embodiment of the invention will be described as an alternative solution to the problem posed, said embodiment differing from the above described embodiments in several features. Nevertheless, it is subject to the same inventive principle of implementing the parallel scanning of several tracks as sequentialized scanning.

Here, on a document moving through the scanning apparatus at a certain feed speed, a number of substantially adjoining places on the document are irradiated with scanning beams by an irradiation arrangement, thereby defining parallel discrete measuring tracks.

Since the irradiation arrangement is adapted to irradiate a number of discrete places on the document separately, such bar codes are preferably scanned in this embodiment whose bars are perpendicular or at least substantially perpendicular to the feed direction of the document, and wherein at least two measuring tracks are defined on the bar code.

A multiplexer disposed upstream of the irradiation arrangement or controlling said arrangement causes the discrete places on the document to be irradiated sequentially by the irradiation arrangement, so that at a certain point in time only one potential measuring track of the document is irradiated and scanned.

The electromagnetic radiation which is emitted by each single one of these discrete radiation sources is subsequently captured by a light guide arrangement and guided to a detector for further processing.

The irradiation arrangement controlled by the multiplexer can preferably be implemented in two different ways, but is not limited thereto.

On the one hand, it is possible to construct the irradiation arrangement from a plurality of individual radiation sources which are disposed at a certain distance side by side substantially perpendicularly to the feed direction of the document, and which in each case irradiate a discrete place on the document and thus define a measuring track. The multiplexer then activates the radiation sources sequentially one after another for scanning a bar code.

On the other hand, it is also possible to implement the irradiation arrangement as a switchable irradiation array for laser light. Said array has a plurality of separately switchable switching elements disposed side by side ("microdisplays") which can in each case assume a closed state of high reflection and an open state of high transmission and in each case define a measuring track on the document. Scanning radiation from a radiation source is coupled into the irradiation array, which fundamentally represents a light guide with separately switchable outputs pointing toward the document, the place on the document to be temporarily irradiated being determined by a corresponding switching of the switching elements. In this variant of the irradiation arrangement, the multiplexer in each case switches exactly one of the switching elements sequentially one after another to "open" or "transmissive", while all others are closed.

The advantage of this variant is that no further moving parts have to be used apart from a single light source. Furthermore, the device is extremely compact.

Due to the sequential activation of the light sources or switching elements, the detector receives only one response signal from a single scanning point of the potential measuring track and then jumps to the next measuring track. For this reason, the measuring points interleaved sequentially due to the sequential activation of the radiation sources/switching elements must, before evaluation, be separated and sorted to form complete measuring tracks by a demultiplexer disposed downstream of the detector. Only then can the evaluation of the measurements be effected by an evaluation device.

For the detector side of this embodiment there are also several preferred variants of a light guide arrangement for capturing the scanning radiation after the scanning of the document and relaying it to the detector.

On the one hand, a light guide with a plurality of attachment lenses can be used, each attachment lens capturing the scanning radiation of a discrete place on the document and coupling it into the light guide. The latter then transports the scanning beam onward to the detector.

On the other hand, the attachment lens can also be omitted if the light guide is designed accordingly. The light guide is then designed and oriented relative to the document so as to be transmissive to the radiation impinging from the direction of the document substantially perpendicularly or at a small angle of incidence, i.e. the angle between the surface normal and the incident beam, and to couple the radiation in. Radiation hitting a boundary surface of the light guide at a greater angle (from outside or inside), however, is almost entirely reflected. As of a certain angle, total reflection sets in.

In a variant of this light guide arrangement, the coupled-in radiation is then reflected on the opposite side of the light guide by a reflecting sawtooth or staircase profile in such a way as to subsequently hit the boundary surfaces of the light guide at such small angles that it is almost entirely reflected thereby, so that it remains within the light guide and is finally relayed to the detector.

In an alternative variant, the light guide is designed in a wedge shape with the opening end pointing toward the detector. Due to the diverging boundary surfaces of the light guide, the coupled-in radiation hits the boundary surfaces at such small angles that the radiation is reflected and relayed to the detector.

In a further alternative embodiment, it is possible to use the light guide described above with reference to the second embodiment and coated with a scatterer layer on the boundary layer facing away from the document. Both in the transmission variant and in the remission variant equipped with a slit in the scatterer layer, the scatterers here effect the deflection or scattering of the coupled-in radiation necessary for relaying.

Preferably, the radiation sources/switching elements are disposed substantially perpendicular to the feed direction of the document along the document plane in this further embodiment. In a transmission solution the light guide arrangement is disposed accordingly on the side of the document plane opposite the radiation sources, whereas the light guide arrangement is disposed on the same side of the document plane in a remission solution.

Since the bar code usually extends only along a limited portion along the complete extension of the document, only a small number of light sources/switching elements is disposed favorably in relation to the bar code in each scanning process, whereas most light sources/switching elements illuminate areas of the document where no bar code is present. As an improved variant of the above described fourth embodiment and its variants, it is therefore possible to search for a track bar disposed in front of the bar code in the feed direction, before the actual scanning of the bar code, the track bar marking that portion of the document where the bar code will be found upon a further feed of the document.

Until detection of the track bar by the evaluation device all available radiation sources/switching elements are activated/enabled by the multiplexer, and the radiation emitted thereby is relayed by the light guide arrangement to the detector. After detection of the track bar only those light sources/switching elements are activated/enabled that are located in the area of the arriving bar code, so that the radiation sources/switching elements in question can be clocked higher in time, leading to an accordingly increased spatial resolution following the feed direction of the document.

All above-mentioned embodiments and alternatives can fundamentally be operated using the same detectors and radiation sources. Detectors to be used are preferably monochromatic indium-gallium-arsenide diodes (InGaAs), germanium diodes (Ge), Si diodes (Si), or bichromatic Si/InGaAs sandwich diodes. The advantage of bichromatic Si/InGaAs diodes is that no optic (e.g. beam splitter) requiring adjustment is needed and a bi-color detection can be carried out. In particular, with a suitable selection of diodes it is possible to excite and evaluate special pigments which are used e.g. in certain value documents such as bank notes.

If polychromatic light is to be used, it is possible to merge different colored light from different radiation sources by means of a beam splitter and to separate this polychromatic scanning beam after the scanning of the document by a suitable beam splitter and supply it to individual detectors. Likewise, it is possible to use a single polychromatic (multispectral) radiation source.

The inventive bar code sensor can also be used in hand-held checking devices and/or be connected to cash registers, in order to e.g. automatically calculate the sum of change in dependence on the price of purchased merchandise and the value of the bank notes scanned in by means of the bar code sensor.

It should be particularly emphasized that the features of the dependent claims and of the embodiments stated in the following description can be used advantageously in combination or also independently of each other and of the subject matter of the main claims.

DESCRIPTION OF THE DRAWINGS

Further features of the invention will result from the following description of different inventive embodiments and alternatives. Reference is made to the figures, which show:

FIG. 1a a first embodiment for transmission scanning of a document with a bar code in a perspective view;

FIG. 1b the beam path of the embodiment shown in FIG. 1A;

FIG. 3b a schematic view of the beam path along the segmented entry mirrors and exit mirrors of the embodiment of FIG. 3a;

DETAILED DESCRIPTION OF EXEMPLARY EMBODIMENTS OF THE DISCLOSURE

Figure 2:
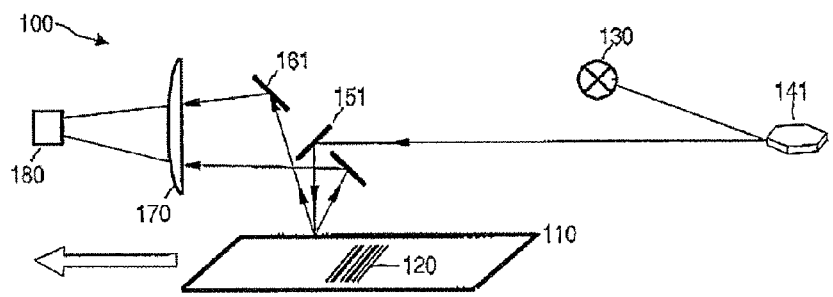
FIG. 2 an alternative to the embodiment shown in FIG. 1a for remission scanning of a document.

FIGS. 1a and 1b show the structure of a scanning apparatus 100 for scanning a document 110 moving in the document plane with a certain feed direction (direction of arrow), for scanning a bar code 120 located on the document 110 by means of radiation transmitted through the document 110.

In this first embodiment, the bars of the bar code 120 are disposed parallel to the feed direction of the document 110. However, the scanning apparatus 100 can be used equally well for scanning and evaluating bar codes 120 whose bars are perpendicular to the feed direction of the document 110. The apparatus 100 as such is not altered by this alternative orientation of a bar code 120, it being merely necessary to adapt a downstream evaluation device for the corresponding evaluation steps. Likewise, it is possible that a scanning apparatus 100 first determines the orientation of the bar code 120 in order to subsequently carry out a corresponding evaluation of the scanned bar code 120 via the evaluation device 185.

The scanning apparatus 100 comprises, between its radiation source 130 and the detector 180, a reflector arrangement which consists of a variable reflection element 140, an entry mirror 150, an exit mirror 160 and a converging lens 170. The beam path of the scanning beam between the radiation source 130 and the detector 180 is shown schematically in FIG. 1b. It is fundamentally possible to provide further deflection mirrors in the beam path according to requirements.

The radiation source 130 is a light emitting diode or laser diode which emits a monochromatic scanning beam. To permit scanning to be carried out with multicolored or polychromatic light, two beam splitters 190, 191 can be inserted in the beam path. The beam splitter 190 is located in the beam path between the radiation source 130 and the variable reflection element 140. Besides the radiation source 130 a second radiation source (not shown) projects a second scanning beam with a different wavelength onto the beam splitter 190 in such a way that the two different-colored scanning beams are merged by the beam splitter 190 and deflected jointly onto the variable reflection element 140.

Since the detectors are as a rule also sensitive only to certain wavelengths, a detector for each of the two wavelengths of the scanning beam is provided at the end of the beam path in each case. Besides the detector 180 a second detector (not shown) is thus necessary, the wavelength components being separated by the beam splitter 191 and deflected to the corresponding detector.

The scanning apparatus 100 is constructed in such a way as to have a small overall depth and thus be implementable as a small and handy scanning device. For this purpose, the various optical reflection and deflection elements 140, 150, 160, 170 are adapted in such a way that the beam path extends substantially parallel to the document plane. For this reason, the variable reflection element 140, which is implemented as a tilting mirror in FIG. 1a, has a tilting axis which extends perpendicular to the document plane. Upon a tilting motion of the tilting mirror 140, the scanning beam emitted by the radiation source 130 is deflected parallel to the document plane and projected onto the entry mirror 150, which has the same dimension perpendicular to the feed speed as the document 110 to be scanned.

The entry mirror 150 deflects the scanning beam impinging parallel to the document plane substantially perpendicularly onto the document plane, so that the scanning beam passes through the document 110 to be scanned. The transmitted radiation hits the exit mirror 160 on the other side of the document plane.

When the tilting mirror 140 is tilted accordingly, the scanning beam can be guided by means of the deflection by the entry mirror 150 onto any desired point of a scanning line which is perpendicular to the feed direction of the document 110, so that the bar code 120 can be scanned independently of its position on the document 110.

The radiation of the scanning beam leaving the document 110 is diffuse due to deflections and refractions on the material of the document 110 and as such hits the exit mirror 160, which reflects the diffuse radiation at right angles parallel to the document plane toward the detector 180.

Like the entry mirror 150, the exit mirror 160 is provided in a dimension corresponding to that of the document 110 perpendicular to the feed direction thereof. In order to permit all scanning beams hitting the exit mirror to be deflected onto a stationary detector 180 at any tilting positions of the tilting mirror 140, a converging lens 170 is provided which focuses the diffuse radiation deflected by the exit mirror 160 onto the detector 180. The converging lens 170 is preferably embodied as an astigmatic lens, so that approximately the same amount of radiation is captured from every point independently of the tilting position of the tilting mirror 140.

The two deflecting mirrors 150, 160 are preferably disposed in such a way that the scanning beam is projected into the document plane, or absorbed thereby, perpendicularly. However, it is likewise possible to choose oblique entry and exit angles onto the document due to constructional requirements. In this case the two deflection mirrors 150, 160 have to be disposed accordingly in offset fashion, in order to permit optimal capture of the diffuse bundle of beams leaving the document 110.

Preferably, the entry mirror 150 and the exit mirror 160 each form an angle of no more than 45 degrees with the document plane, whereby smaller angles further reduce the overall depth of the scanning apparatus 100 without limiting its functionality. It is advantageous to choose the angle in such a way that the detector receives only diffuse light and does not measure at the glancing angle (total reflection) of the scanning beam.

The tilting mirror 140 shown in FIG. 1*a* preferably has a reflecting coating on both sides, so that it can be used as a rotating mirror and carry out a single continuous rotary movement during scanning. Instead of the tilting mirror 140 it is possible to use polygonal mirrors. The tilting mirror 140 can also be designed as an oscillating (micro-) mirror.

When a document 110 is conveyed in the feed direction by the scanning apparatus 100, it is scanned vertically line by line by the arrangement of the optical elements 140, 150, 160, 170. With a bar code 120 whose bars are oriented parallel to the feed direction of the document 110, the tilting speed of the tilting element 140 and the feed speed of the document 110 can be coordinated in such a way that the scanning beam moves across the entire extension of the bar code 120 at least twice, i.e. along two different measuring tracks.

Due to the continuous and stepless movement of the tilting mirror 140, the spatial resolution necessary for scanning the bar code 120 can readily be ensured. However, the detector 180 and the evaluation device 185 disposed downstream thereof must also support an accordingly fast rotation of the tilting mirror 140 and thus a high scanning speed. Upon use of digital components, the CCD camera must thus have a sufficiently high image frequency, or the detector, such as an InGaAs-based detector, a correspondingly high cutoff frequency.

If the bars of the bar code 120 are oriented perpendicular to the feed direction, the spatial resolution in the feed direction during scanning of the bar code 120 is determined mainly by the feed speed of the document 110, so that with accordingly thin bars or spaces between bars (i.e. with high-frequency structures) said speed must be accordingly low, or the deflection of the scanning beam by the tilting mirror 140 must be effected accordingly fast.

In a transmission solution like that shown in FIG. 1*a*, only those documents can be scanned that are at least minimally transmissive, e.g. tickets, value documents, bank notes and the like, but not chip cards.

In contrast, bar codes on opaque documents or larger objects can also be scanned by a corresponding inventive remission sensor. Such a remission variant of the embodiment shown in FIG. 1*a* is shown schematically in FIG. 2.

In the embodiment shown in FIG. 2 as well, an arrangement is chosen that ensures a minimal overall depth of the scanning apparatus 100, by having the beam path extent almost entirely parallel to the document plane.

Here, the scanning beam from the radiation source 130 hits a variable reflection element 140 which is designed as a polygonal mirror 141 in this embodiment. The polygonal mirror 141 deflects the scanning beam parallel to the document plane onto the entry mirror 151, which reflects the scanning beam onto the document 110.

The scanning beam emitted by the radiation source 130 is deflected by the polygonal mirror 141, in accordance with the schematic view in FIG. 2, perpendicular to the plane of projection and thus parallel and transversely to the document. This causes a document 110 moving in the feed direction (direction of arrow) to be scanned line by line over its entire width. In this implementation variant, the bars of the bar code 120 are disposed in the document plane perpendicular to the feed direction and thus parallel to the deflection of the scanning beam.

The scanning beam is reflected diffusely by the document, then hits the exit mirror 161, which deflects the diffuse radiation substantially at right angles onto the converging lens 170, which in turn focuses it onto the detector 180.

In the variant shown in FIG. 2, the entry mirror 151 is disposed in a gap in the exit mirror 161. Both mirrors 151, 161 are sufficiently large to extend over the entire width of the document 110, so that a bar code 120 can be scanned at any place on the document 110. Due to the gap in the exit mirror 161 a certain fraction of the reflected, diffuse radiation is lost, but the remaining part actually hitting the exit mirror 161 is as a rule sufficient to permit a reliable detection and recognition of the bar code.

Deviating from the arrangement shown in FIG. 2, it is also possible to insert the variable reflection element 141 directly in the place of the entry mirror 151 in the gap in the exit mirror 161 and to omit the entry mirror 151. It is likewise possible to dispose the variable reflection element 141 or the entry mirror 151 not in a gap in the exit mirror 161, but spatially separated therefrom. Many different arrangements of the various optical deflection elements are fundamentally possible in this way without abandoning the inventive principle.

Figure 3A:
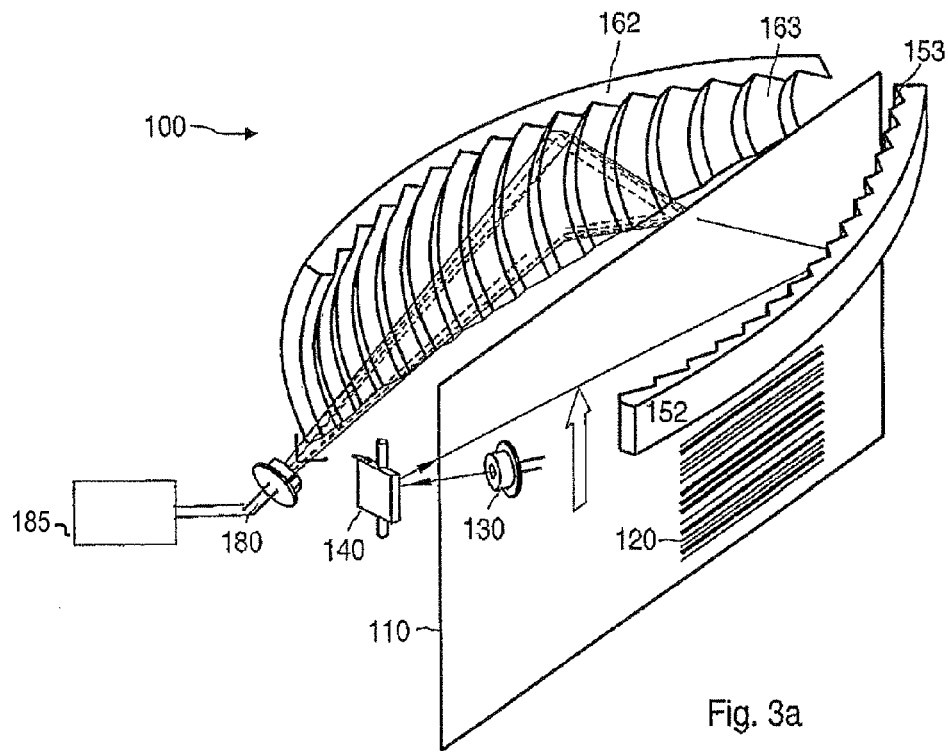
FIG. 3a a second embodiment for transmission scanning of a document by means of segmented mirrors.

FIG. 3*a* shows a second embodiment of the invention which allows transmitting scanning of a document 110 with a bar code 120 disposed perpendicularly in relation to the feed direction (direction of arrow).

Just as in the above described embodiments, the reflector arrangement in FIG. 3*a* again consists of a radiation source 130, a variable reflection element 140, an entry mirror 152, an exit mirror 162, and a detector 180, whereby the entry and exit mirrors 152, 162 are each formed as segmented mirrors here.

The segments 153 of the entry mirror 152 are disposed in such a way as to in each case deflect the scanning beam coming from the variable reflection element 140 substantially perpendicularly into the document plane. Each mirror segment 152 irradiates an associated portion of the document plane situated parallel to the feed direction, so that the scanning in this embodiment is not continuous, but discrete, since each mirror segment 153 defines a separate scanning track through the bar code 120. For this reason, this apparatus 100 can only be used for scanning bar codes 120 whose bars are oriented substantially perpendicular to the feed direction, since only for such bar codes 120 can the spatial resolution required for scanning be ensured. Fundamentally, such a bar code 120 is then scanned with exactly as many parallel measuring tracks as there are mirror segments 153 positioned along the width of the bar code 121.

The individual mirror segments 152 are irradiated sequentially through the continuous deflection of the scanning beam by the variable reflection element 140. Coordinated with the feed speed of the document 110, the speed of deflection of the scanning beam by the variable reflection element 140 is thus effected line by line at a speed sufficient to ensure the required spatial resolution.

The radiation of a scanning beam projected into the document plane perpendicularly by the entry mirror 152 leaves the document 110 diffusely on the other side of the document plane and hits a mirror segment 163 of the segmented exit mirror 162. The latter finally focuses the radiation onto the detector 180, which transforms the optical information into an electric signal and supplies it to a downstream evaluation device 185.

Preferably, a number of converging lenses (not shown) is disposed on the exit side of the document plane in such a manner that one converging lens is provided for each mirror segment 163 of the exit mirror 162. Such a converging lens ideally captures the bundle of beams projected into the document plane by its associated mirror segment 153 and projects it in a bundled form onto the corresponding mirror segment 163 of the exit mirror 162.

In this second inventive embodiment as well, there are diverse possibilities of positioning the deflection mirrors 152, 162. In a particularly preferred variant, the exit mirror 162 is disposed spherically around the scanning line of the document plane, in order to permit a maximum fraction of the diffuse scanning radiation to be captured after passage through the document 110.

Figure 3B:
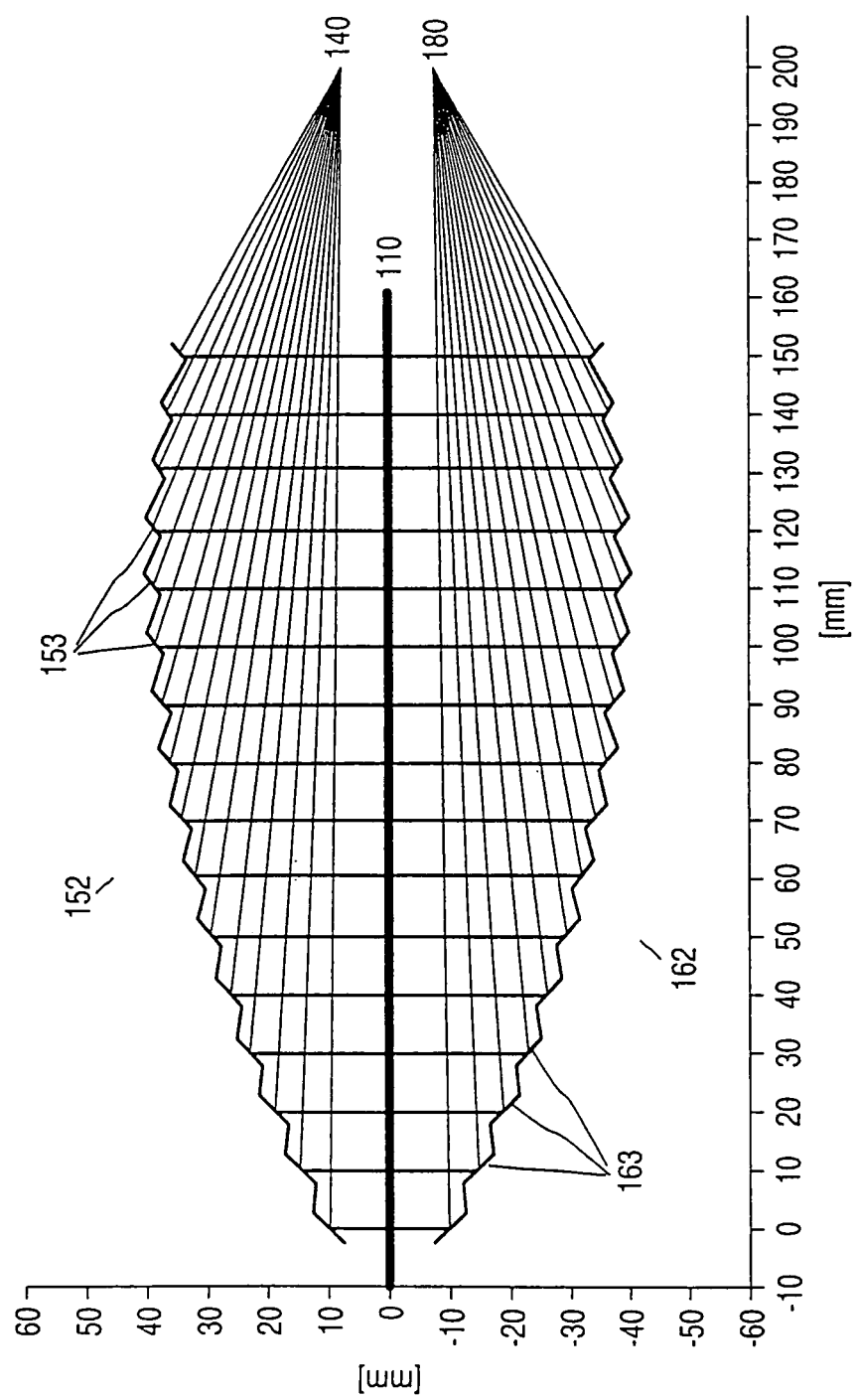

FIG. 3b shows a schematic overview of the beam path from the radiation source 130 via the mirror segments 153 of the entry mirror 152, the document 110 and the mirror segments 163 of the exit mirror 162 to the detector 180, as well as the compact size of the segmented mirrors 152, 162. Only the central beams are shown in each case.

It can be seen that each mirror segment 153 irradiates a certain portion on the document 110 as a limited interval around the corresponding central beam. The discrete scanning of the document 110 results from the fact that, upon deflection by the variable reflection element 140, the scanning beam moves on sequentially from one mirror segment 153 to the next, and each mirror segment 153 illuminates a clearly defined portion of the document 110 which is distinct from the portions of the other mirror segments 153.

Besides the arrangements of the entry and exit mirrors 152, 162 shown in FIGS. 3a and 3b which are intended for transmission scanning, a remission scanning is rendered possible by disposing the segmented exit mirror 162 on the same side of the document plane as the segmented entry mirror 152, the entry mirror 152 being positioned in a gap in the exit mirror 162 similarly to FIG. 2a. Alternatively, it is possible to use only a central area of the mirror as an entry mirror, the other areas of the mirror surrounding said center area being designed to deflect the radiation emanating from the document onto the detector.

On the other hand, it is also possible to integrate the exit mirror 162 directly into the entry mirror 152, by designing those mirror segments of the entry mirror 152 that are positioned between two mirror segments 153 acting as an entry mirror, as exit mirror segments. The latter then project the scanning beams reflected by the document 110 ideally in alignment with the incident beam onto a detector 180.

Figure 4:
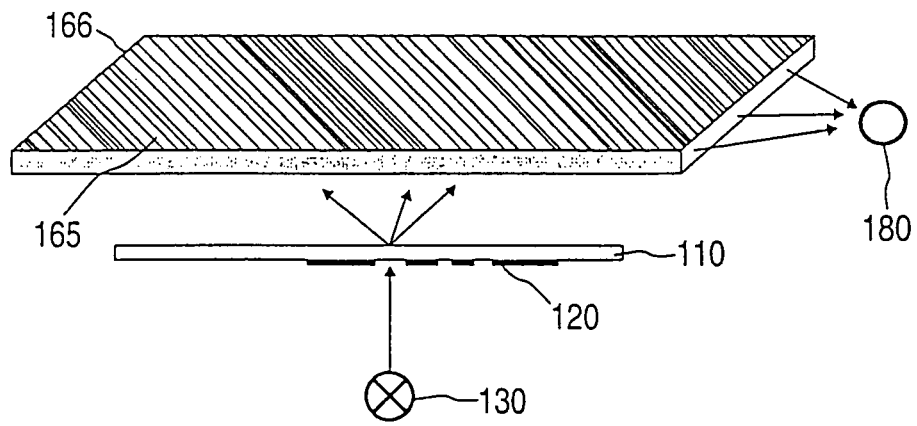
FIG. 4 an alternative to the embodiments of FIGS. 1 to 3 with a light guide with a scatterer layer.

FIG. 4 illustrates an alternative to the first two embodiments which does without separate exit mirror arrangements, instead providing a light collecting element such as a light guide 165.

Although FIG. 4 shows transmission scanning, the light guide 165 can also be used for remission scanning in a slightly modified form.

In the shown transmission case, the light guide 164 is of a flat design and disposed substantially parallel to the document 110 on the side of the document plane opposite the radiation source 130. The boundary layer of the light guide 165 facing the document is transparent to scanning beams coming from the document 110 and hitting it substantially perpendicularly, so that said beams are coupled into the light guide 165. The directly coupled-in scanning beams run through the light guide 165 and hit a scatterer layer 166 (shown hatched) on the boundary layer of the light guide 165 facing away from the document 110, which reflects them diffusely and thus deflects them from their almost entirely perpendicular direction. The deflected beams then remain predominantly within the light guide 165 and are relayed thereby to the detector 180, since their angles of incidence on the internal boundary surfaces of the light guide 156 are now predominantly so small that the beams are reflected inwardly again. It is advantageous here to mirror-coat the lateral boundary surfaces (gray background) not facing the detector 180 to support the relaying of the coupled-in beams.

In this manner it is possible to capture and detect at least part of the radiation transmitted by the document 110, almost independently of the radiation intensity, over the entire surface of the document 110.

In a corresponding remission solution, the coated light guide 165 can be disposed between the document 110 and an entry mirror, if present, a reflector element or the radiation source 130 with the scatterer-coated boundary surface 166, facing the entry mirror/reflector element or the radiation source 130. In this case, a slit is provided in the scatterer layer 166, through which the scanning radiation can pass from the radiation source 130 to the document 110, from where it is reflected back to the light guide 165 and, reflected by the scatterer layer 166, relayed to the detector 180.

The light guide 165 preferably consists of a polymer, whereas the scatterer layer 166 is preferably realized by a coat of light-scattering paint on the corresponding side of the polymer.

Figure 5:
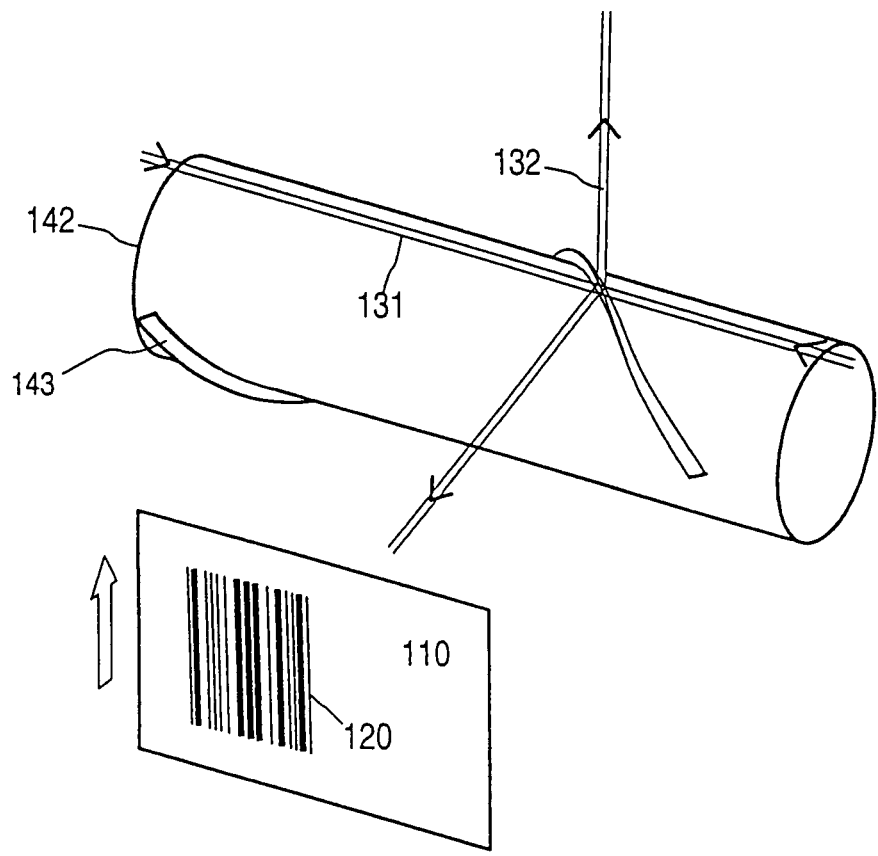
FIG. 5 a third embodiment for scanning a document by means of a rotating cylinder with a reflecting, raised thread.

FIG. 5 shows a third embodiment of the present invention comprising, as the reflector arrangement, a rotating cylinder 142 which is equipped on its surface with a raised thread 143 which reflects the impinging scanning beams onto the document plane.

Although FIG. 5 shows only the cylindrical reflector arrangement 142, 143 and the resulting deflected scanning beams 131, 133, it is obvious that it can be equipped with all additional optical elements of the above-described embodiments in order to provide more extensive effects such as a reduced mounting depth or a certain beam path. In particular, it is possible here, too, to provide an entry mirror which deflects the emitted radiation from a radiation source onto the reflecting thread 143 or which is disposed parallel to the rotation axis of the cylinder 142 along its entire length in order to deflect the scanning beam onto a document 110 to be scanned. Moreover, it is also possible here to use exit mirror, converging lens and beam splitter in accordance with the above-described embodiments.

In any case, the scanning beam 131 impinges axially along the surface of the rotating cylinder 142 on a certain point of the helical thread 143, on which the scanning beam 131 is deflected preferably at right angles onto the document plane. Upon a rotation of the cylinder 142 this reflection point moves along the thread 143, thus being displaced in the axial direction transversely to the feed direction of the document 110. When the cylinder 142 has completed one revolution around its rotation axis, the reflection point jumps back to the start of the thread and a further line is scanned on the document 120.

Starting out from this basic arrangement, numerous different variants of the cylinder 142 and the threads 143 applied thereto are possible. For example, it is possible to deflect a scanning beam 131 into the document plane tangentially by disposing a radiation source accordingly, or to radially deflect another scanning beam 132 which is irradiated from the opposite side of the cylinder 142.

It is particularly advantageous to use two threads which each cover different areas of the surface of the cylinder 142 and are axially illuminated by associated radiation sources positioned at opposite ends of the cylinder 142. In this way it is possible to scan a document 110 perpendicular to its feed direction at double speed, since each of the two scanning beams hitting the document plane scans its own portion of a measuring line in parallel. Double scanning speed is reached in particular when two threads are disposed on the cylinder 142 in parallel, each of which covers only 180° of the cylinder. A division into two partial lines with two radiation sources and two detectors also allows a reduction of the required cutoff frequencies.

Detectors to be used can be fundamentally any type that is sensitive to the particular emission spectrum used. However, it is preferable to use silicon, germanium or InGaAs detectors in all embodiments of the present invention.

Figure 6:
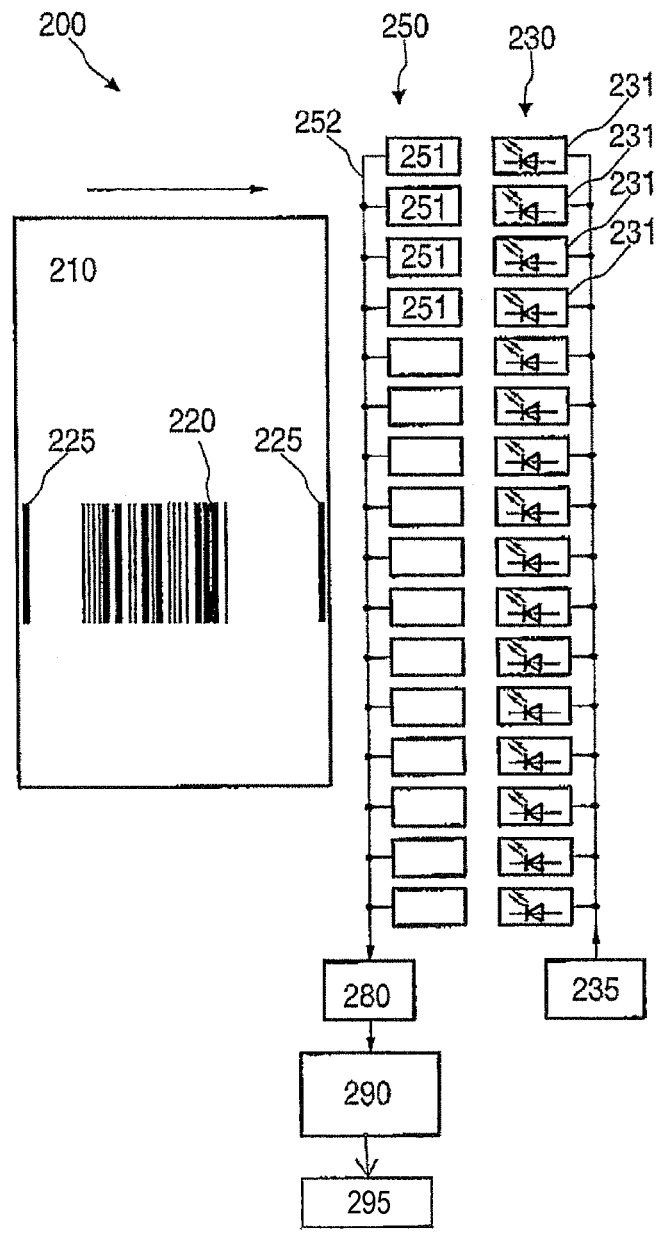
FIG. 6 a fourth embodiment for scanning a document with radiation sources disposed sequentially by means of a multiplex drive, and a light guide arrangement.
Figure 7:
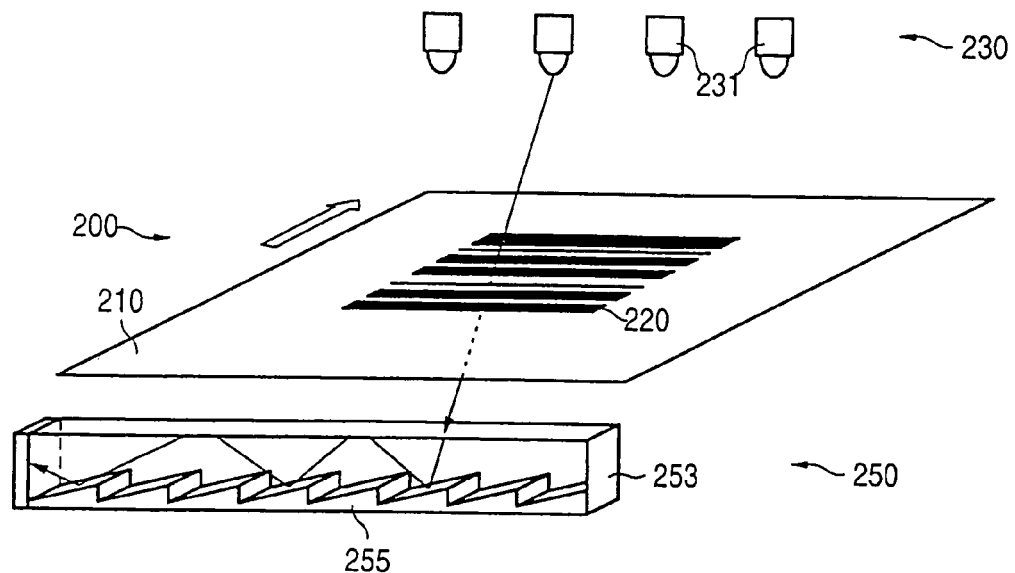
FIG. 7 an alternative to the embodiment shown in FIG. 6 with a light guide arrangement having an internal sawtooth profile.
Figure 8:
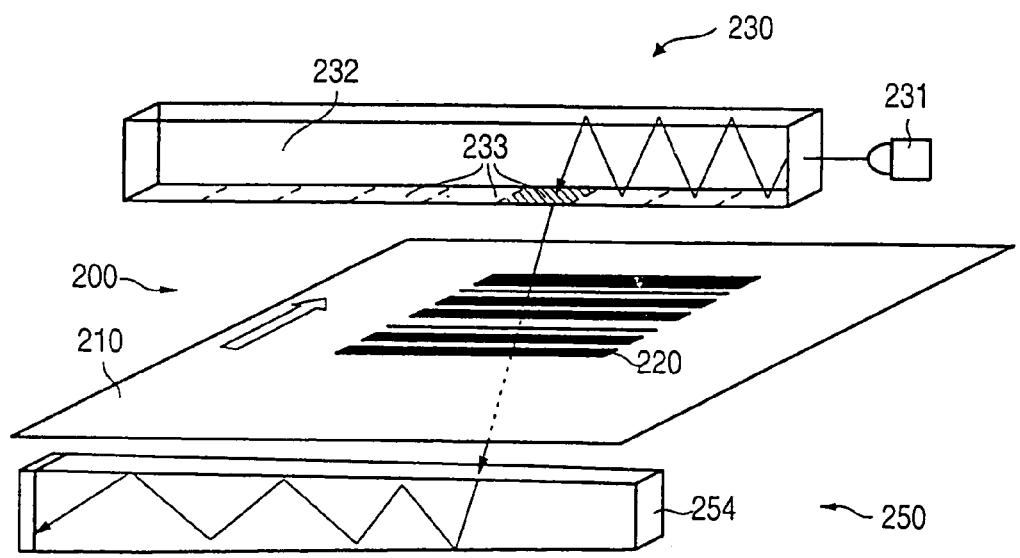
FIG. 8 a further alternative to the embodiment shown in FIG. 6 with a switchable irradiation array and a wedge-shaped light guide arrangement.

FIGS. 6, 7 and 8 finally illustrate a fourth embodiment of the present invention in three variants which, like the second embodiment (FIGS. 2a, 2b), can first only scan those bar codes 220 whose bars are oriented substantially perpendicular to the feed direction of the document 210, since an irradiation arrangement 230 irradiates a plurality of discrete places located side by side on the document 210 to be scanned, and thus defines invariable discrete scanning tracks parallel to the feed direction.

In the variants shown in FIGS. 6 and 7, the irradiation arrangement 230 consists of a plurality of radiation sources 231 which are spaced apart perpendicular to the feed direction of the document 210, and are activated sequentially by the multiplexer 235. The activation of the radiation sources 231 thus runs along the entire width of the document 210 in an endless loop and then starts all over again. The spacing of the radiation sources is preferably about 1 cm in this embodiment.

Another variant is shown in FIG. 8, where the irradiation device 230 consists of a switchable irradiation array 232 and only one radiation source 231 which couples the scanning radiation into the irradiation array 232.

The irradiation array 232 is preferably designed as a light guide, in which the side facing the document plane is equipped with switchable optical elements 233, preferably liquid crystal microdisplays, which each are associated with a discrete place on the document 210 and have two switching states: an open or transmissive state (shown hatched in FIG. 8) and a closed or nontransmissive state. The remaining sides of the irradiation array 232 are preferably mirror-coated.

In the open state the switching elements 233 have high transmission, so that a light beam or laser beam can exit from the irradiation array 232 toward the document plane at this place, whereas in the closed state the switching elements 233 are strongly reflective and reflect an impinging beam back inside the irradiation array 232. For sequential scanning of the measuring tracks defined by the switching elements 233, their states are driven by a controlling or multiplexing device 235 in such a way that only one switching element 233 is in the open state at a time and the switching elements 233 are opened and closed sequentially one after another in an endless loop.

Both aforesaid variants of the irradiation arrangements have fundamentally the same effect and allow sequential scanning of discrete places on the document 210 along spaced measuring tracks perpendicularly to the bar code 220.

The electromagnetic scanning radiation emitted by each of the radiation sources 231 or the irradiation array 232 is captured by a light guide arrangement 250 and supplied to the detector 280, which is preferably an InGaAs detector. FIGS. 6, 7 and 8 show variants of this light guide arrangement 230 in the form of a light guide 252 with attachment lenses 251 (FIG. 6), a light guide 253 with an internal reflecting sawtooth profile 255 (FIG. 7), and a light guide 254 tapering in a wedge shape (FIG. 8).

In FIG. 6, a light guide 252 captures the scanning beams reflected by, or transmitted through, the document 210 moving in the feed direction, by means of attachment lenses 251 which are each associated with one of the radiation sources 231, and guides the captured radiation on to the common detector 280. The light guide arrangement 250 of FIG. 6 can, as shown, consist of a single light guide 252 which is connected to each of the attachment lenses 251 via branches, or of a light guide with an attachment lens 251 for each radiation source 231. However, it is also possible to use an arrangement as in FIG. 1a with mirror and lens.

FIGS. 7 and 8 show a light guide 253, 254 as a light guide arrangement 250, which couples in radiation impinging on an entry side substantially perpendicularly, whereas radiation impinging on a boundary surface of the light guide 253, 254 non-perpendicularly (or at a rather obtuse angle in relation to the surface normal) is reflected. The light guide is thus advantageously made of a material with a high refraction index in relation to the surrounding atmosphere. A suitable selection of material makes it possible to exactly determine the limiting angle between reflection and transmission. The entry side can additionally be equipped with an interference filter which passes a certain wavelength range, e.g. 1500 nm, and blocks others.

In order to relay a coupled-in beam within the light guide, it must thus be reflected internally in such a way as not to hit the boundary surfaces perpendicularly. This is implemented in different ways in FIGS. 7 and 8.

The light guide 253 of FIG. 7 comprises, on the side opposing the entry side, a reflecting sawtooth profile 255 directed toward the interior of the light guide 253, which profile is necessarily hit by radiation entering the light guide 253. The radiation is reflected by the sawtooth profile 255 toward the detector 280 in such a way as to subsequently hit the other boundary surfaces of the light guide 253 in such a way that the scanning radiation is almost entirely reflected.

The light guide 254 of FIG. 8 has a wedge-shaped or conical form, thereby causing scanning radiation entering the light guide 254 to hit the boundary surfaces of the light guide 254 at a suitably obtuse angle, so that the scanning beam remains within the light guide. In order for the coupled-in beams to be relayed to the detector 280, the wedge-shaped light guide 254 is oriented with its wide end toward the detector 280.

As a further variant of a light guide for relaying the radiation reflected or transmitted by the document 210, it is also possible to use the scatterer-coated light guide shown in FIG. 4 and discussed above in connection with the second embodiment, both in its transmission variant and in the remission variant. The scatterer layer acts here in the same manner as the reflecting sawtooth profile 255 of the light guide 253 shown in FIG. 7, or the wedge shape of the light guide 254 in FIG. 8.

In each of the implementation variants of FIGS. 6, 7 and 8, the detector 280 receives, in a scanning process, response signals which each represent line-by-line scanning places on the document 210 in accordance with the feed direction of the document 210. Each of said lines thus carries out a discrete scanning along a line which is parallel to the bars of the bar code 220 to be scanned. The feed of the document 210 then yields a separate measuring track for each scanning place during scanning However, since the measuring tracks are scanned point by point in an interleaved manner due to the sequential drive of the irradiation arrangement 230, a demultiplexing device 290 is provided downstream of the detector, which resolves the scanning places determined line by line, in accordance with the individual measuring tracks, sorts them and supplies them contiguously to the evaluation device 295.

Since in the fourth embodiment shown in FIGS. 6, 7 and 8, the light guide arrangement 250 fundamentally performs the same functions as the various reflector arrangements in the above-mentioned three embodiments (FIGS. 1 to 5), it is accordingly also possible to use, instead of the preferred light guide system 250, mirror or lens arrangements, e.g. a segmented mirror, having the same effect. It is likewise possible to accordingly use the light guide arrangements illustrated in FIGS. 6, 7 and 8 in the above-described three embodiments as well.

Like the above-described embodiments, this fourth embodiment can also be implemented in a transmission variant and a remission variant. In the transmission variant the illumination arrangement 230 and the light guide arrangement 250 are located on different sides of the document plane, whereas in the remission variant both arrangements are disposed on the same side of the document plane.

In a preferred embodiment of the variant shown in FIG. 6, it is possible to replace the plurality of radiation sources 231 by a single radiation source whose electromagnetic radiation serves to irradiate the entire document homogeneously via scattering and deflecting elements transversely to the feed direction.

In this fourth embodiment of the invention, fundamentally all radiation sources 231 or optical switching elements 233 are sequentially activated or enabled by the multiplexer 235, independently of whether they actually irradiate the bar code 220 in dependence on the position thereof on the document 210. However, in FIG. 6, due to the position and width of the bar code 220 only three of the altogether sixteen radiation sources 231 of the irradiation arrangement 230 are disposed in such a way that the scanning beams emitted thereby are reflected in each case by a place on the document 210 that belongs to the bar code 220.

Therefore, in a particularly preferred embodiment of the fourth embodiment, it is possible to scan documents 210 that announce the position of the bar code 220 on the document 210 by track bars 225 at the edges of the document 210. As soon as such a track bar 225 is scanned by the scanning apparatus 200 and detected as such by its evaluation device 295, only those light sources 231 or switching elements 233 are subsequently activated or enabled that are positioned during the further feed of the document 210 in such a way that they actually illuminate the bar code 220. In this manner it is possible to scan the bar code 220 either at an accordingly higher spatial resolution or at a higher feed speed and the same spatial resolution while the activating or switching speed of the individual radiation sources 231 or switching elements 233 remains the same, due to the more frequent activation or enabling of the selected radiation sources 231 or switching elements 233.

The type of detector to be used for all above-mentioned embodiments and alternatives is fundamentally any type that is sensitive to the particular emission spectrum used. However, it is preferable to use InGaAs detectors in all embodiments of the present invention. In addition, many other detectors can be used, e.g. also germanium detectors or silicon detectors. Likewise, it may be expedient in certain applications of the invention to use hybrid Si/InGaAs sandwich detectors, in which the two sandwich detectors are each sensitive in a different spectral range and thus permit two light colors to be detected simultaneously. Such bichromatic detectors can then optionally be combined with a bichromatic (or multis-pectral) radiation source.

In particular when sufficient light or radiation is available, it is also possible to use, as an alternative to the sandwich diodes, segmented or divided photodiodes, e.g. InGaAs diodes vapor-coated with suitable filters.

For all above-mentioned embodiments, the radiation sources used may be special light emitting or laser diodes which emit monochromatic light, i.e. light of a narrow frequency band of the electromagnetic spectrum, or multispectral or polychromatic light. However, it is preferable to use at least also light emitting diodes which emit wavelengths from the near infrared region or the far infrared region. Likewise, upon use of suitable detectors and radiation sources it is possible to carry out simultaneous measurements in the visible and near IR regions or a simultaneous or exclusive scanning of luminescent or fluorescent structures. This makes it possible for example to detect two or more bar codes simultaneously, e.g. a red bar code and an IR-absorbing bar code.

The feed of a document through the scanning apparatus is ensured as a rule automatically by a suitable feed device. However, in order to further reduce costs and overall depth, it is possible to provide for the particular user of the scanning apparatus to push or pull the document through manually.

The embodiments of the present invention are fundamentally suitable for being adapted to the detection of any types of one-dimensional bar codes, e.g. EAN, UPC, 2/5 Codes, Code 39, Codabar, Code 93, Code 128, PDF 417, etc. Likewise, the printing technique with which a bar code is applied to the document is irrelevant for the detection of the bar code. It is possible to use e.g. standard printing methods, such as relief and gravure printing, offset printing, screen printing, thermal printing, laser printing, ink-jet and dot-matrix printing.

According to the invention, scanning apparatuses (100; 200), among other things, are thus proposed for scanning bar codes (120; 220) applied to documents (110; 210), which each have a reflector arrangement (140, 150, 160, 170; 141, 151, 161; 152, 162; 165; 142, 143) which comprise either a variable reflection element (140; 141; 142, 143) or a light guide system (250, 251, 252; 253, 255; 254) which serves to deflect the beam path of the electromagnetic radiation emitted by a radiation source (130) or an illumination device (230, 231; 232, 233), in the document plane along a line substantially perpendicular to the feed direction of the document (110; 210), or to capture it, and to relay it to a detector (280). In combination with the feed motion, the line-by-line scanning of the document (110; 210) along the different measuring tracks on the basis of the repeated deflection of the beam path by means of the variable reflection element (140; 141; 142, 143) or the repeated sequential relaying of the scanning beam by the light guide arrangement (250, 251, 252; 253, 255; 254) then results in reasonably priced and compact scanning apparatuses (100; 200), since the redundant radiation sources (130; 230) and detectors (180; 280) can be omitted.

The invention claimed is:

1. A scanning apparatus for multitrack scanning of a bar code of a document moved in a feed direction along at least one document plane, comprising:
   at least one radiation source for producing an electromagnetic scanning beam,
   a reflector arrangement arranged to deflect the scanning beam from the at least one radiation source to at least one detector, while including the document, and
   an evaluation device arranged to evaluate the scanning beam detected along at least two measuring tracks by the at least one detector, wherein the reflector arrangement comprises at least one variable reflection element arranged to deflect the beam path of the scanning beam along a line of the document plane which runs substantially perpendicular to the feed direction, wherein the evaluation device is arranged to evaluate electromagnetic radiation of the scanning beam which is detected by the at least one detector along measuring tracks which run substantially parallel to the feed direction, wherein scanning of a bar code is enabled.

2. The scanning apparatus according to claim 1, wherein the reflector arrangement comprises an exit mirror arranged to guide radiation received from the line of the document plane to the detector.

3. The scanning apparatus according to claim 2, wherein the reflector arrangement is disposed on one side of the document plane in order to detect radiation of the scanning beam reflected by the document; and the exit mirror comprises a central gap in which the variable reflection element is disposed.

4. The scanning apparatus according to claim 2, further comprising an entry mirror, wherein the entry mirror comprises a plurality of mirror segments, the variable reflection element arranged to deflect the scanning beam sequentially onto the mirror segments, so that the beam path is deflected discretely along the line of the document plane; and wherein the exit mirror comprises a plurality of mirror segments.

5. The scanning apparatus according to claim 2, further comprising an entry mirror, wherein the entry mirror comprises a plurality of mirror segments, the variable reflection element arranged to deflect the scanning beam sequentially onto the mirror segments, so that the beam path is deflected discretely along the line of the document plane; wherein the exit mirror comprises a plurality of mirror segments; and wherein the mirror segments of the entry and exit mirrors are disposed alternatingly side by side in such a way that the beam path runs substantially in the same direction before the entry mirror and after the exit mirror.

6. The scanning apparatus according to claim 1, wherein the reflector arrangement comprises a light guide arranged to guide radiation received from the line of the document plane to the detector.

7. The scanning apparatus according to claim 6, wherein the light guide comprises a scatterer layer on a side facing away from the document.

8. The scanning apparatus according to claim 7, wherein the reflector arrangement is disposed on one side of the document plane in order to detect radiation of the scanning beam reflected by the document; wherein the reflector arrangement comprises an entry mirror arranged to deflect the scanning beam onto the line of the document plane; wherein the light guide is disposed between the document plane and the entry mirror; and wherein the scatterer layer comprises a slit through which the scanning beam is deflected from the entry mirror to the document.

9. The scanning apparatus according to claim 1, wherein the reflector arrangement is disposed on one side of the document plane in order to detect radiation of the scanning beam reflected by the document.

10. The scanning apparatus according to claim 1, wherein the variable reflection element is a tilting or rotating mirror.

11. A scanning apparatus for multitrack scanning of a bar code of a document moved in a feed direction along at least one document plane, said scanning apparatus comprising:
    at least one radiation source configured to produce an electromagnetic scanning beam;
    at least one detector configured to receive the electromagnetic scanning beam;
    a reflector arrangement arranged to deflect the scanning beam from the at least one radiation source to the document and the at least one detector, said reflector arrangement comprising at least one variable reflection element arranged to deflect a beam path of the scanning beam along a line of the document plane which runs substantially perpendicular to the feed direction and an entry mirror arranged to deflect the scanning beam onto the line of the document plane; and
    an evaluation device arranged to evaluate the electromagnetic scanning beam detected along at least two measuring tracks by the at least one detector,
    wherein the evaluation device is arranged to evaluate electromagnetic radiation of the scanning beam which is detected by the at least one detector along measuring tracks which run substantially parallel to the feed direction, wherein scanning of a bar code is enabled.

12. The scanning apparatus according to claim 11, wherein the reflector arrangement comprises an entry mirror arranged to deflect the scanning beam onto the line of the document plane; and wherein the variable reflection element arranged to deflect the scanning beam onto the entry mirror substantially parallel to the document plane.

13. The scanning apparatus according to claim 12, further comprising an exit mirror, wherein the entry mirror and the exit mirror are disposed at an angle smaller than 45 degrees in relation to the document plane.

14. The scanning apparatus according to claim 11, wherein the entry mirror comprises a plurality of mirror segments, the variable reflection element arranged to deflect the scanning beam sequentially onto the mirror segments, so that the beam path is deflected discretely along the line of the document plane.

15. The scanning apparatus according to claim 14, further comprising an exit mirror, wherein at least one of the entry mirror and the exit mirror is formed spherically around the line of the document plane.

16. The scanning apparatus according to claim 14, further comprising an exit mirror, wherein the mirror segments of at least one of the entry mirror and exit mirror are formed concavely in each case.

17. The scanning apparatus according to claim 11, wherein the scanning radiation emitted by at least one of the radiation sources is monochromatic.

18. The scanning apparatus according to claim 11, wherein the scanning beams comprise wavelengths from the near infrared region or the far infrared region.

19. The scanning apparatus according to claim 11, wherein the radiation sources are light emitting diodes.

20. The scanning apparatus according to claim 11, wherein the radiation sources emit scanning beams of several wavelength ranges, and the at least one detector is sensitive to said wavelength ranges.

21. The scanning apparatus according to claim 11, wherein the reflector arrangement comprises an exit mirror arranged to deflect the scanning beam onto the line of the document plane; and wherein the beam path behind the exit mirror runs substantially parallel to the document plane.

22. A scanning apparatus for multitrack scanning of a bar code of a document moved in a feed direction along at least one document plane, said scanning apparatus comprising:
    at least one radiation source configured to produce an electromagnetic scanning beam;
    at least one detector configured to receive the electromagnetic scanning beam;
    a reflector arrangement arranged to deflect the scanning beam from the at least one radiation source to the document and to the at least one detector, said reflector arrangement comprising at least one variable reflection element arranged to deflect a beam path of the scanning beam along a line of the document plane which runs substantially perpendicular to the feed direction; and an evaluation device arranged to evaluate the electromagnetic scanning beam detected along at least two measuring tracks by the at least one detector, wherein the beam path passes through the document plane in order to detect radiation transmitted through the document by the at least one detector.

23. The scanning apparatus according to claim 22, wherein the at least one detector includes one of an InGaAs sensor, a Ge detector and a Si/InGaAs detector.

24. The scanning apparatus according to claim 22, wherein the document is moved, along the document plane at a defined feed speed.

25. A scanning apparatus for multitrack scanning of a bar code of a document moved in a feed direction along at least one document plane, said scanning apparatus comprising:

at least one radiation source configured to produce an electromagnetic scanning beam;

at least one detector configured to receive the electromagnetic scanning beam;

a reflector arrangement arranged to deflect the scanning beam from the at least one radiation source to the document and the at least one detector, said reflector arrangement comprising at least one variable reflection element arranged to deflect a beam path of the scanning beam along a line of the document plane which runs substantially perpendicular to the feed direction and an exit mirror arranged to guide radiation received from the line of the document plane; and wherein the beam path behind the exit mirror runs substantially parallel to the document plane; and an evaluation device arranged to evaluate the electromagnetic scanning beam detected along at least two measuring tracks by the at least one detector.

26. A scanning apparatus for multitrack scanning of a bar code of a document moved in a feed direction along at least one document plane, said scanning apparatus comprising:

at least one radiation source configured to produce an electromagnetic scanning beam;

at least one detector configured to receive the electromagnetic scanning beam;

a reflector arrangement arranged to deflect the scanning beam from the at least one radiation source to the document and the at least one detector, said reflector arrangement comprising at least one variable reflection element arranged to deflect a beam path of the scanning beam along a line of the document plane which runs substantially perpendicular to the feed direction, wherein the variable reflection element comprises a rotating cylinder comprising a surface having at least one reflecting, raised thread disposed helically along a rotation axis of the rotating cylinder, said scanning beam path-arranged to be deflected axially along the surface of the cylinder and deflected by the reflecting thread; and an evaluation device arranged to evaluate the electromagnetic scanning beam detected along at least two measuring tracks by the at least one detector.

27. The scanning apparatus according to claim 26, further comprising a first reflecting thread arranged to extend along a first axial portion of the cylinder, and wherein the surface of the cylinder comprises a second reflecting, raised thread which is disposed helically along a different axial portion of the cylinder, and the scanning apparatus comprises two radiation sources which are disposed relative to the threads in such a manner that their beam paths are deflected along different portions of the line of the document plane upon rotation of the cylinder.

28. A scanning apparatus for multitrack scanning of a bar code of a document moved in a feed direction along at least one document plane, said scanning apparatus comprising:

at least one radiation source configured to produce an electromagnetic scanning beam;

at least one detector configured to receive the electromagnetic scanning beam;

a reflector arrangement arranged to deflect the scanning beam from the at least one radiation source to the document and the at least one detector, said reflector arrangement comprising at least one variable reflection element arranged to deflect a beam path of the scanning beam along a line of the document plane which runs substantially perpendicular to the feed direction and at least one converging lens arranged to focus the electromagnetic scanning beam onto the at least one detector, wherein the at least one converging lens is an astigmatic lens; and an evaluation device arranged to evaluate the electromagnetic scanning beam detected along at least two measuring tracks by the at least one detector.

29. A scanning apparatus for multitrack scanning of a bar code of a document moved in a feed direction along at least one document plane, said scanning apparatus comprising:

at least one radiation source configured to produce an electromagnetic scanning beam;

at least one detector configured to receive the electromagnetic scanning beam;

a reflector arrangement arranged to deflect the scanning beam from the at least one radiation source to the document and the at least one detector, said reflector arrangement comprising at least one variable reflection element arranged to deflect a beam path of the scanning beam along a line of the document plane which runs substantially perpendicular to the feed direction and a first and second beam splitter, wherein the first beam splitter is arranged to combine the electromagnetic radiation in the beam path before the document plane from at least two monochromatic partial radiations of different wavelengths, and the second beam splitter is arranged to separate the combined electromagnetic radiation in the beam path through the document plane into partial radiations; and an evaluation device arranged to evaluate the electromagnetic scanning beam detected along at least two measuring tracks by the at least one detector.

30. A scanning apparatus for the multitrack scanning of a bar code of a document moved in a feed direction along at least one document plane, wherein components are disposed substantially perpendicular to the feed direction, said scanning apparatus comprising:

an irradiation arrangement for irradiation of the document plane in selected places with electromagnetic scanning beams, and an evaluation device configured to evaluate along at least two measuring tracks the radiation of the scanning beams detected by the at least one detector, wherein the scanning apparatus comprises a multiplexing device arranged to cause the irradiation arrangement to irradiate a plurality of discrete places on the document plane one after another, which are spaced apart substantially perpendicular to the feed direction.

31. The scanning apparatus according to claim 30, wherein the irradiation arrangement comprises a plurality of radiation sources, and the multiplexing device is configured to activate the plurality of radiation sources sequentially.

32. The scanning apparatus according to claim 31, wherein the beam paths from the radiation sources to the at least one detector pass through the document plane in order to detect radiation transmitted by the document by the at least one detector.

33. The scanning apparatus according to claim 30, wherein the irradiation arrangement comprises a radiation source and an irradiation array with a plurality of switchable optical elements which may in each case assume a transmissive and a nontransmissive state, the radiation source configured to couple radiation into the irradiation array, and the multiplexing device configured to sequentially switch the plurality of switchable optical elements transmissive.

34. The scanning apparatus according to claim 30, wherein the scanning apparatus comprises a light guide arrangement arranged to guide the scanning beams from the irradiated places on the document plane to a common detector.

35. The scanning apparatus according to claim 34, wherein the light guide arrangement comprises a plurality of attachment lenses which are connected to a light guide, the attachment lenses arranged to capture in each case the scanning beams from an irradiated place on the document plane, and the light guide arranged to guide the scanning beams captured by the attachment lenses to the detector.

36. The scanning apparatus according to claim 34, wherein the light guide arrangement comprises a light guide arranged to capture scanning beams impinging from outside substantially perpendicularly, and to relay them within the light guide.

37. The scanning apparatus according to claim 36, wherein the light guide has a sawtooth profile directed into its interior, which reflects scanning beams in such a way that they remain within the light guide.

38. The scanning apparatus according to claim 36, wherein the light guide is formed in a wedge shape, so that scanning beams are reflected in such a way that they remain within the light guide.

39. The scanning apparatus according to claim 36, wherein the light guide comprises a scatterer layer on its boundary surface facing away from the document.

40. The scanning apparatus according to claim 39, wherein the light guide is disposed between the document plane and the irradiation arrangement, and the scatterer layer comprises a slit through which the scanning beams are guided from the irradiation arrangement to the document.

41. The scanning apparatus according to claim 34, wherein the light guide arrangement comprises at least one converging lens arranged to focus the scanning beams onto a single detector.

42. The scanning apparatus according to claim 30, wherein the scanning apparatus comprises a demultiplexing device configured to time-resolve the electromagnetic scanning beams arriving sequentially at the detector.

43. The scanning apparatus according to claim 30, wherein the evaluation device is configured to recognize a track bar on the document, and the multiplexing device is configured to thereupon activate only those radiation sources located in the area of the track bar.

* * * * *